J. H. CHUBB.
CULTIVATOR.
APPLICATION FILED NOV. 1, 1916.
1,218,743.
Patented Mar. 13, 1917.
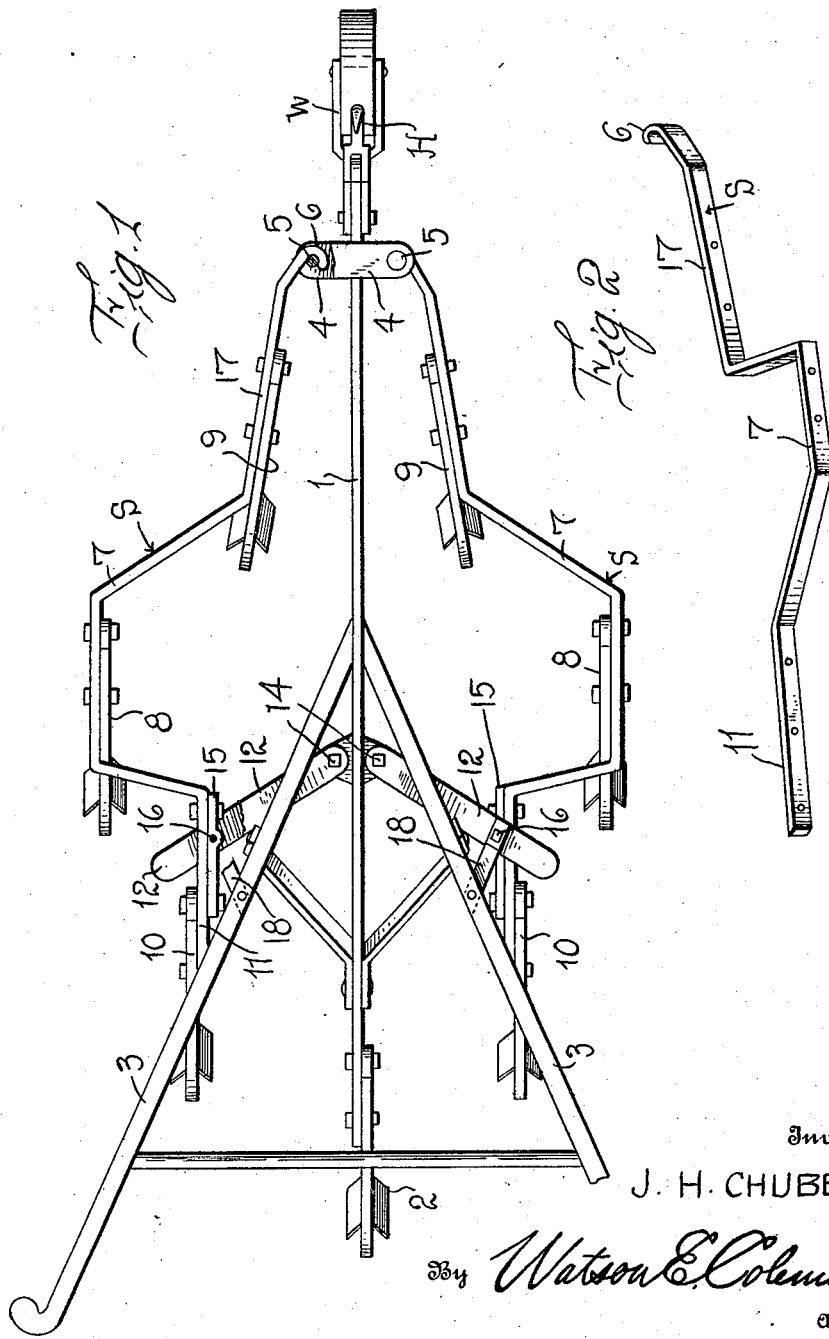
Inventor
J. H. CHUBB
By Watson E. Coleman
Attorney

UNITED STATES PATENT OFFICE.

JOHN HARVEY CHUBB, OF HALIFAX TOWNSHIP, DAUPHIN COUNTY, PENNSYLVANIA.

CULTIVATOR.

1,218,743.  Specification of Letters Patent.  Patented Mar. 13, 1917.

Application filed November 1, 1916. Serial No. 128,964.

*To all whom it may concern:*

Be it known that I, JOHN HARVEY CHUBB, a citizen of the United States, residing in Halifax township, in the county of Dauphin and State of Pennsylvania, have invented certain new and useful Improvements in Cultivators, of which the following is a specification, reference being had to the accompanying drawings.

This invention relates to certain improvements in cultivators and it is an object of the invention to provide a novel and improved cultivator which serves to effectively act upon the soil between adjacent rows so that weeds or the like between said rows are completely covered.

It is also an object of the invention to provide a cultivator preferably of a walking type and which is provided with side irons and wherein each of said irons has an intermediate portion outwardly offset with the shovel operatively engaged with said offset portion and adapted to engage the soil in close proximity to a row.

The invention consists in the details of construction and in the combination and arrangement of the several parts of my improved cultivator whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in top plan with a portion in section of a cultivator constructed in accordance with an embodiment of my invention; and Fig. 2 is a view in perspective of a side iron as herein employed, detached.

As disclosed in the accompanying drawings, 1 denotes an elongated beam of predetermined configuration provided adjacent its forward end with a supporting wheel W and a hitch H for purposes which are believed to be clearly apparent to those skilled in the art to which my invention appertains.

Secured to the rear end portion of the beam 1 is a cultivator shovel 2, and also operatively engaged with the beam 1 are the handles 3 of a conventional type. The forward end portion of the beam 1 has operatively engaged therewith the vertically spaced cross straps 4 extending beyond opposite sides of the beam 1 and having their extremities connected by the vertically disposed bolts 5.

Coacting with each of the bolts 5 is the hooked end 6 of a side iron S, said iron S being provided intermediate its length with the outwardly disposed offset 7 to which is adapted to be secured a cultivator shovel 8. The portion of the side iron S in advance of the offset 7 has secured thereto a second cultivator shovel 9, while the rear portion of said side iron has also secured thereto a cultivator shovel 10.

As is particularly illustrated in Fig. 1, it is to be noted that the portion 11 of the side iron S rearwardly of the offset portion 7 is arranged substantially in parallelism with the beam 1 and in spaced relation thereto and has coacting therewith the brace members 12 secured to the beam 1, as at 14, and to the plate 15 secured to the inner face of the portion 11 and preferably through the medium of the bolt 16. The plate 15 is provided to afford means whereby the brace members 12 may be readily engaged with the side irons S without the necessity of weakening said side iron which would result in the event the bolt 16 was disposed directly through said side iron. The rear portion 11 is also disposed outside of the portion 17 of the side iron S in advance of the offset portion 7, whereby it will be perceived that the shovels 8, 9 and 10 occupy differing planes parallel to the beam 1 so that as the cultivator is drawn between rows the soil intermediate said rows is so turned as to effectively cover weeds or the like which may be between said rows.

I also find it of advantage to interpose between each of the handles 3 and the adjacent brace member 12 the substantially vertically disposed reinforcing or bracing strap 18, the bolt 16 hereinbefore referred to serving to secure the lower end of said strap 18 to the member 12.

From the foregoing description, it is thought to be obvious that a cultivator constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

In combination with a cultivator, a side iron having its forward end provided with a hook adapted to engage with a part of the cultivator, the intermediate portion of said iron being offset outwardly, shovels carried by the opposite end portions, a plate secured to the inner face of the side iron rearwardly of and immediately adjacent the offset portion of the side iron, and the intermediate portion of said iron, and bracing means coacting with the cultivator and the plate.

In testimony whereof I hereunto affix my signature in the presence of two witnesses.

JOHN HARVEY CHUBB.

Witnesses:
 FRED J. BYROD,
 WILLIAM F. HESS.

Copies of this patent may be obtained for five cents each, by addressing the "Commissioner of Patents, Washington, D. C."